W. LA HODNY & F. X. KIBITZ.
MACHINE FOR BEVELING MIRRORS AND FOR ANALOGOUS PURPOSES.
APPLICATION FILED JULY 14, 1916.
1,275,569.
Patented Aug. 13, 1918.
2 SHEETS—SHEET 1.
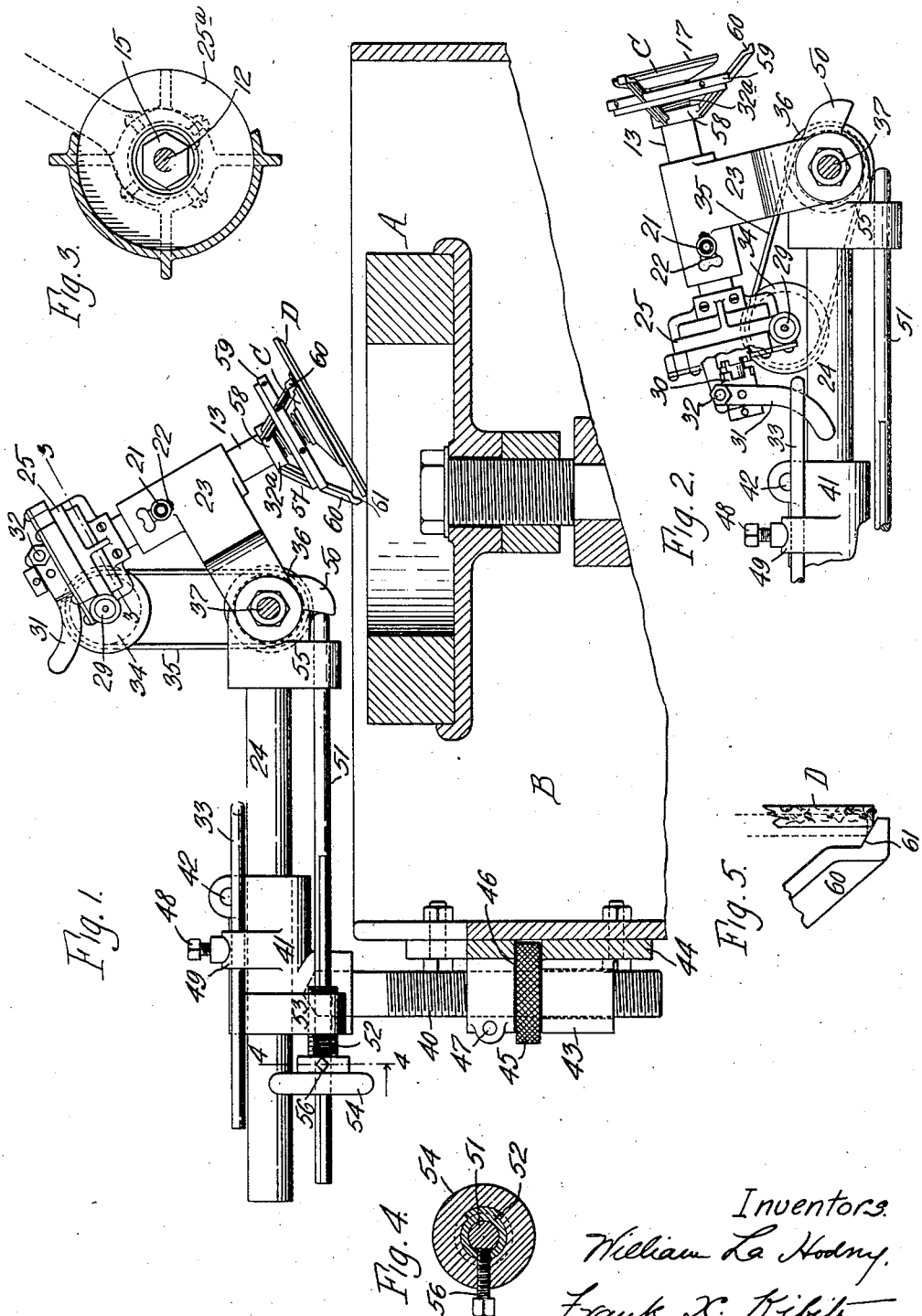
Inventors.
William La Hodny.
Frank X. Kibitz.
By Wilhelm & Parker
Attorneys.

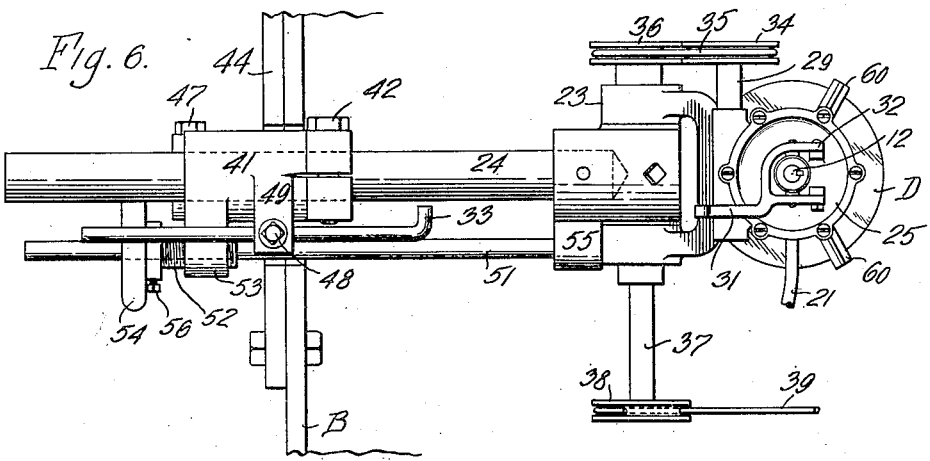
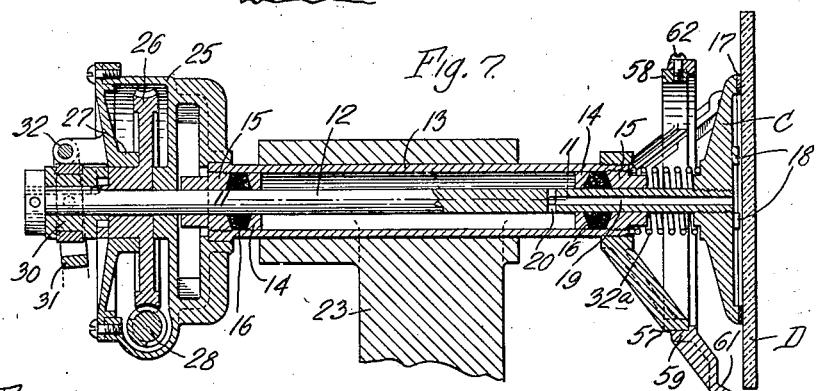
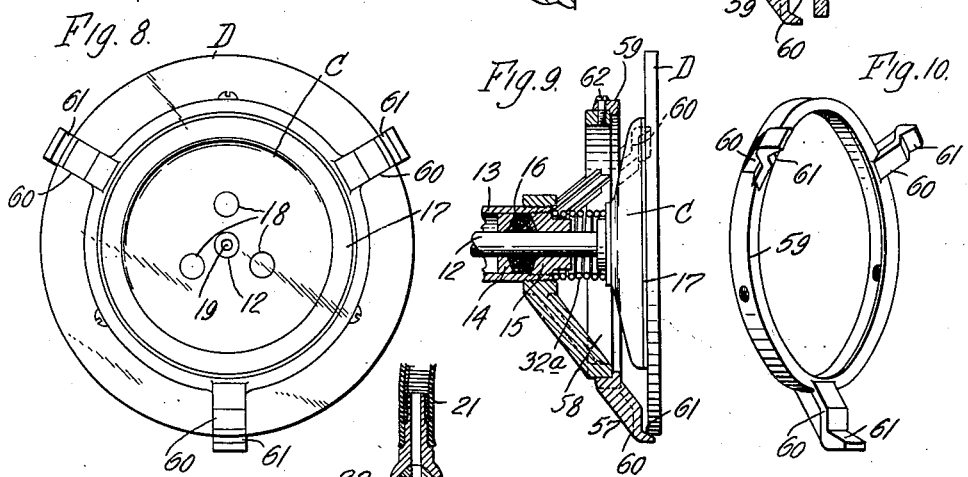
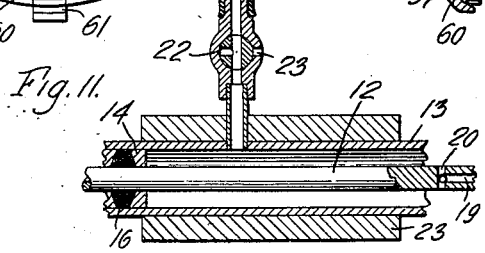

UNITED STATES PATENT OFFICE.

WILLIAM LA HODNY AND FRANK X. KIBITZ, OF BUFFALO, NEW YORK, ASSIGNORS TO STANDARD MIRROR CO., OF BUFFALO, NEW YORK.

MACHINE FOR BEVELING MIRRORS AND FOR ANALOGOUS PURPOSES.

1,275,569. Specification of Letters Patent. Patented Aug. 13, 1918.

Application filed July 14, 1916. Serial No. 109,284.

*To all whom it may concern:*

Be it known that we, WILLIAM LA HODNY, a citizen of the United States, residing at Buffalo, in the county of Erie and State of New York, and FRANK X. KIBITZ, of Buffalo, in said county and State, have invented a new and useful Improvement in Machines for Beveling Mirrors and for Analogous Purposes, of which the following is a specification.

This invention relates to grinding and finishing or polishing machines. While machines constructed in accordance with the invention are primarily intended for, and particularly adapted for beveling and finishing the edges of circular glass mirrors, they are not restricted to use for this purpose but are also adapted by reason of the possible adjustments of the machines for grinding and finishing or polishing the edges and also the surfaces of circular glass plates and other plates or disks.

One object of the invention is to provide a machine by means of which the edges of circular plates can be rapidly and inexpensively beveled or finished, and which can be readily adjusted to produce bevels or edges of any desired angularity on plates of different sizes. Other objects of the invention are to provide a machine of the kind stated with means whereby the plate can be quickly and accurately centered and secured on the revolving chuck so as to grind or finish the edge to a true circle, and readily removed from the chuck; also to provide a vacuum chuck and centering device arranged so that the plate can be engaged with the centering device for centering it on the chuck, which chuck, when the plate has been secured thereon, moves the plate to an operative position away from the centering device for grinding or finishing the edge of the plate; also to provide in connection with the chuck, a clutch for stopping the rotation of the chuck when it is moved to the position for receiving the plate, and for rotating the chuck when the plate has been secured thereon and the chuck is moved for grinding or finishing the plate; also to provide a vacuum chuck or plate holder which is adapted for holding plates of different sizes and a removable plate centering device whereby the centering device for a plate of one size can be readily removed and replaced by a centering device for a plate of different size; also to provide adjusting means of simple and convenient construction whereby the chuck can be readily adjusted for grinding or finishing plates of different size and thickness for grinding or finishing bevels or edges at different angles and for positioning the plate with reference to the abrading wheel as may be necessary or desirable to secure the most efficient abrading action.

In the accompanying drawings:—

Figure 1 is a side elevation partly in section of a machine embodying the invention.

Fig. 2 is an elevation, showing the inoperative or plate receiving position of the chuck.

Fig. 3 is a transverse section, enlarged, on line 3—3, Fig. 1, indicating by dotted lines a wrench in position for turning the packing nut for the chuck spindle.

Fig. 4 is a section on line 4—4, Fig. 1 of the adjustable stop for determining the operating angle of the grinding head.

Fig. 5 is a fragmentary view of one of the fingers of the centering device showing the position of the plate relative thereto.

Fig. 6 is a plan view of the machine showing the chuck in a vertical position.

Fig. 7 is a longitudinal sectional elevation of the chuck and associated parts on an enlarged scale.

Fig. 8 is an end elevation, enlarged, of the chuck and centering device with a glass plate in position thereon.

Fig. 9 is a sectional elevation thereof, showing the position of the chuck when centering the plate thereon.

Fig. 10 is a detached perspective view of the centering device.

Fig. 11 is a fragmentary section on line 11—11, Fig. 7.

A represents an abrading wheel which may be of any usual or suitable kind adapted for performing the grinding, finishing or polishing operation, the machine being adapted, depending upon the sort of abrading wheel employed for performing any of these different operations. The wheel A shown is mounted to turn in the usual box or trough B.

C represents a rotary chuck or holder on which the plate D to be operated upon is secured and which is driven for revolving the plate while it is held in operative contact with the abrading wheel. A vacuum or suction chuck or holder C is employed on which the plate is secured by simply placing the plate against the end face of the chuck and operating a valve or device to connect the chuck with the vacuum or suction-producing means. The chuck C is secured to the end of a spindle or shaft 12 which is mounted to rotate and to slide endwise to a limited extent in a hollow supporting shaft or tube 13. This tube 13 is provided at its end portions with packing glands of any suitable construction adapted to permit the rotation and endwise movement of the spindle while preventing the leakage of air into the tube. Each gland shown consists of a plug 14 fixed in the supporting tube 13 and a screw plug 15 which fits in the threaded end of the tube and is adapted to be screwed into the tube for compressing the packing material 16 around the revolving spindle between the opposing concaved ends of the screw plug and the fixed plug. The outer ends of the screw plugs are of hexagonal or other shape adapted for the application of a wrench or other tool for turning the plugs. The outer end of the chuck has a suction cavity surrounded by a lip provided with a yielding gasket 17 against which the plate D is adapted to bear and one or more studs 18 are preferably provided in the cavity to bear against the plate and prevent undue strain thereon. The spindle 12 is provided with a longitudinal passage 19 and one or more transverse holes 20 by which the cavity in the chuck is placed in connection with the interior of the supporting tube 13 between the packing glands, and the supporting tube 13 is connected with a vacuum pump or other vacuum producing means by a flexible hose 21 or by connections of any suitable sort adapted to permit the adjustments of the chuck hereinafter described. A valve 22 of any suitable kind controls this hose or connection. A hand operated three-way valve is shown. By placing the plate against the end of the chuck and turning the valve to the position shown in Fig. 11, the cavity of the chuck is placed in connection with the vacuum producing means and the plate will be held on the chuck by atmospheric pressure. By turning the valve to a position to connect the tube 13 with an escape port 23 in the valve casing the vacuum is broken so that the plate is released and can be removed from the chuck.

The spindle-supporting tube 13 is secured on an arm or support 23 which is hinged to swing vertically toward and from the abrading wheel on an adjustable arm or support 24. Secured to the upper or inner end of the supporting tube 13 is a gear casing 25 for inclosing and protecting the drive gearing for the chuck. This casing is preferably provided at one side, see Fig. 3, with an opening 25ª through which a wrench or tool can be inserted for turning the screw plug 15 of the inner packing gland. The drive gearing shown comprises a worm wheel 26 journaled in a suitable bearing 27 in the casing 25 to revolve freely about the chuck spindle 12 and this wheel meshes with and is driven by a worm 28 secured on a shaft 29 which is journaled in suitable bearings in the casing and extends out of the same at one end. The bearing 27 for the worm wheel 26 is preferably formed on a removable end or cover plate for the gear casing. The worm wheel is adapted to be coupled to and uncoupled from the chuck spindle by a suitable clutch, which in the construction shown consists of a member 30 splined on the chuck spindle and having teeth or projections at its inner end adapted to engage teeth or projections on the outer end of the hub of the worm wheel 26. 31 indicates a clutch-operating lever which is suitably fulcrumed at 32 on the gear casing and is provided with a forked end which straddles the clutch member 30 and is provided with studs or anti-friction rollers extending therefrom into a circumferential groove in the clutch member. By operating this lever the clutch member 30 and the spindle secured thereto are moved out of connection with the worm wheel 26. A spring 32ª surrounding the chuck spindle between the chuck and the outer end of the supporting tube 13 tends to move the spindle outwardly and move the clutch member into operative connection with the worm wheel. This spring also acts to press the plate D on the chuck yieldingly against the abrading wheel when the chuck is moved to working position, as shown in Fig. 1. The clutch-operating lever is preferably provided with a bent end adapted to strike a trip rod or device 33 for automatically releasing the clutch and stopping the rotation of the chuck when the chuck is swung back to move the plate out of contact with the abrading wheel, as shown in Fig. 2.

The worm 28 can be driven by any suitable driving means. As shown, the worm shaft 29 is provided at its outer end with a pulley 34 connected by a belt 35 to a pulley 36 on a shaft 37 which is suitably journaled on the arm or support 24 concentrically with the pivotal axis for the carrying arm 23, and is provided with a pulley 38 driven by a belt 39. By means of this construction the arm 23 carrying the chuck can be swung to any necessary angular position relative to the abrading wheel and the worm wheel 26 will be continuously driven in all positions of the chuck and can be coupled to and uncoupled from the chuck by operating the clutch 30.

The support or arm 24 is mounted so as to be adjustable horizontally endwise toward and from the axis of the abrading wheel on a post or support 40 which is adjustable vertically for raising and lowering the arm 24 and parts carried thereby to different elevations relative to the abrading wheel. As shown the post 40 is provided at its upper end with a horizontal sleeve 41 through which the arm 24 passes and this sleeve is split at one end and provided with a clamping screw 42. By tightening this screw the sleeve is contracted on the arm 24 to secure the latter rigidly in the sleeve. The arm 24 can thus be adjusted endwise in the sleeve to any desired position and rigidly secured by tightening the screw 42. The post is preferably arranged to move vertically in a guide sleeve 43 on a bracket or support 44 which is bolted or secured in any suitable manner to the box B. The post is provided with a threaded portion which works in the threaded hole of a nut or wheel 45 which is held from endwise movement in a slot 46 in the sleeve 43. By turning this nut or wheel the post can be adjusted up or down to place the arm 24 and parts carried thereby at the desired elevation. Preferably, the upper portion of the bracket sleeve 43 is split and is provided with a clamping screw 47 for contracting this split part on the post to hold the post rigidly in the position to which it is adjusted. The clutch trip rod 33 is adjustably secured, as by a set screw 48 in a guide lug 49 on the post 40 so that the trip rod can be adjusted horizontally with the supporting arm 24 to enable like operation of the clutch in the different adjustments of the supporting arm.

By means of these adjustments the chuck can be adjusted to any desired angle to the face of the abrading wheel and can also be adjusted vertically and horizontally in any of its angular positions relatively to the abrading wheel. It is therefore possible to adjust the chuck to grind or finish a bevel of any desired angularity on the plate so as to contact with the abrading wheel at the proper point to insure the most efficient abrading action. It is also possible to adjust the chuck to operate on either the face or edge of the plate. The abrading wheel shown in Fig. 1 is not adapted to grind the edge of the plate at right angles to the face of the plate, but the edge can be thus ground by substituting an appropriate abrading wheel in place of the wheel A shown.

50 indicates a lug or part on the hinged arm 23 adapted to strike a stop rod or device 51 to determine the angular position of the chuck relative to the abrading wheel. This stop rod as shown, is provided with a screw sleeve 52 working in a screw threaded hole in a lug or part 53 on the post 40, so that by turning this screw sleeve by a wheel or handle 54 thereon the stop can be adjusted to arrest the chuck at different angles to the abrading wheel. The stop rod preferably passes through a guide 55 on the arm 24. In order to enable the stop rod to be adjusted horizontally with the arm 24 when the latter is adjusted, the screw sleeve 52 is adjustably secured on the stop rod, for instance by a set screw or the like 56. By loosening this set screw the stop rod can be adjusted with the arm 24, and by again tightening the set screw the screw sleeve is secured to the stop rod for adjusting it to regulate the angular position of the chuck.

57 represents a centering device for centering the plate D on the chuck C concentric with the axis thereof. The centering device shown consists of an inner part or frame 58 secured on the chuck-supporting tube 13 back of the chuck, and a detachable ring 59 provided with outwardly projecting fingers 60 having beveled inner faces 61 adapted to engage the edge of the plate D on the chuck. The ring 59 is removably secured to the frame 58 by screws 62 or otherwise and is large enough to pass over the chuck C, so that a centering ring suitable for a plate of one size can be readily detached and replaced by a ring suitable for a plate of different size. When the chuck is swung away from the abrading wheel, as shown in Fig. 2, and the spindle 12 and chuck are retracted by the operation of the clutch, as before explained, the centering fingers will project beyond the plane of the holding face of the chuck, as shown in Fig. 9. A plate D can then be placed against the face of the chuck and shifted thereon until its circular edge engages the centering fingers which will center the plate properly with reference to the chuck. In cutting the plates D, one edge is usually true and substantially smooth while the other edge may be more or less broken or uneven. By placing the true edge against the beveled faces of the centering fingers the plate is accurately centered and on account of the beveled faces, plates which differ slightly in diameter will be properly centered. The chuck is held from rotation and the suction producing means are disconnected when thus placing the plate on the chuck, and the plate can therefore be readily centered on the chuck. When the plate has been centered, the valve 22 is operated to cause the chuck to hold the plate and the chuck is then moved to place the plate in contact with the abrading wheel. The movement of the chuck toward the abrading wheel moves the clutch-operating lever out of engagement with the trip rod 33 and releases the clutch and the spring 32ª then moves the chuck outwardly engaging the clutch 30 with the worm wheel 26 and causing the rotation of the chuck. This action of the spring moves the plate outwardly away from the fingers of the centering device and the plate is held clear of the centering device while it is being revolved by the chuck in contact with the abrading wheel. The centering device therefore does not interfere with the contact of the edge of the plate with the abrading wheel or with the angular adjustment of the plate relatively to the wheel. In the operation of the machine the chuck is swung toward the abrading wheel until the plate is pressed against the abrading wheel and the chuck is arrested by the stop 51 which has been adjusted to give the desired angle to the bevel. The spring 32$^a$ is compressed somewhat and presses the plate against the abrading wheel with sufficient force to effect the abrading until the edge is beveled an amount determined by the adjustment of the machine. The plates are thus uniformly beveled at the desired angle. The plates can be rapidly placed on and removed from the chuck and very little effort and experience is required to rapidly and efficiently operate the machine.

We claim as our invention:—

1. The combination with an abrading wheel for a plate, of a rotary chuck for the plate, a device for centering the plate on the chuck, said chuck and centering device being relatively movable endwise toward and from each other for centering the plate on the chuck and holding the plate clear of the centering device, driving means for the chuck, and means for stopping the rotation of the chuck to enable the plate to be secured thereon.

2. The combination with an abrading wheel for a plate, of a rotary chuck for the plate, a device for centering the plate on the chuck, said chuck and centering device being relatively movable endwise toward and from each other for centering the plate on the chuck and holding the plate clear of the centering device, driving means for the chuck, and means for stopping the rotation of the chuck for securing the plate thereon, said stopping means also moving the chuck toward the centering device.

3. The combination with an abrading wheel for a plate, of a rotary chuck for the plate, a device for centering the plate on the chuck, said chuck and centering device being relatively movable endwise toward and from each other for centering the plate on the chuck and holding the plate clear of the centering device, driving means for the chuck, and means operated by moving the chuck away from the abrading wheel for stopping the rotation of the chuck to enable the plate to be secured thereon.

4. The combination with an abrading wheel for a plate, of a rotary chuck for the plate, a device for centering the plate on the chuck, said chuck and centering device being relatively movable endwise toward and from each other for centering the plate on the chuck and holding the plate clear of the centering device, driving means for the chuck, and means operated by moving the chuck away from the abrading wheel for stopping the rotation of the chuck to enable the plate to be secured thereon, said stopping means also moving the chuck toward the centering device.

5. The combination with an abrading wheel for a plate, of a rotary chuck, a device for centering the plate on the chuck, drive means for the chuck, and means for moving the chuck into position relative to the centering device for centering the plate on the chuck and for uncoupling the chuck from the driving means to enable the plate to be centered on the chuck.

6. The combination with an abrading wheel for a plate, of a rotary chuck mounted to swing toward and from the abrading wheel, a device for centering the plate on the chuck, driving means for the chuck, and means operated by swinging the chuck away from the abrading wheel for stopping the rotating of the chuck to enable the plate to be centered on the chuck.

7. The combination with an abrading wheel for a plate, of a rotary chuck mounted to swing freely toward and from an operative position relative to the abrading wheel, said chuck being held loosely in said operative position and being free to move away from the abrading wheel, driving means for the chuck, a clutch, means which actuate the clutch to stop the rotation of the chuck when the chuck is swung away from the abrading wheel to enable the plate to be secured on the chuck, and means which actuate the clutch to couple the chuck to the driving means when the chuck is swung toward the abrading wheel.

8. The combination with an abrading wheel for a plate, of a rotary chuck mounted to swing freely toward and from an operative position relative to the abrading wheel, said chuck being held loosely in said operative position and being free to move away from the abrading wheel, driving means for the chuck, a clutch for coupling the chuck to the driving means, a clutch-operating lever, a trip device which engages said lever and actuates the clutch to stop the rotation of the chuck when the chuck is swung away from the abrading wheel to enable the plate to be secured to the chuck, and a spring which actuates the clutch to couple the chuck to the driving means when the chuck is swung toward the abrading wheel.

9. The combination with an abrading wheel for a plate, of a vacuum chuck on which the plate is held by atmospheric pressure, and which is movable for placing the plate into and out of contact with the abrading wheel and is loosely held with the plate in contact with the abrading wheel and is free to move away from the abrading wheel, means for rotating the chuck, means for stopping the rotation of the chuck for securing the plate thereon, and means for controlling the vacuum to hold and release the plate.

10. The combination with an abrading wheel for a plate, of a vacuum chuck on which the plate is held by atmospheric pressure and which is movable for placing the plate into and out of contact with the abrading wheel and is loosely held with the plate in contact with the abrading wheel and is free to move away from the abrading wheel, means for rotating the chuck, means which operate automatically when the chuck is moved away from the abrading wheel to stop the rotation of the chuck for securing the plate thereon, and means for controlling the vacuum to hold and release the plate.

11. The combination with an abrading wheel for a plate, of a rotary chuck for the plate, a pivoted arm on which said chuck is journaled, a horizontally adjustable arm on which said pivoted arm is pivoted to swing toward and from the abrading wheel and is loosely held with the plate in contact with the abrading wheel and is free to move away from the abrading wheel, a vertically adjustable support for said horizontally adjustable arm, and means for driving said chuck.

12. The combination with an abrading wheel for a plate, of a rotary chuck for the plate, a pivoted arm on which said chuck is journaled, a support on which said pivoted arm is pivoted to swing toward and from the abrading wheel and is loosely held with the plate in contact with the abrading wheel and is free to move away from the abrading wheel, means for adjusting said support in directions at right angles to each other, and means for driving the chuck.

13. The combination with an abrading wheel for a plate, of a rotary chuck for the plate, a pivoted arm on which said chuck is journaled, a support on which said pivoted arm is pivoted to swing toward and from the abrading wheel, an adjustable stop for limiting the swinging movement of said arm toward the abrading wheel, said arm being held loosely against said stop and free to move away from the abrading wheel, means for adjusting said support in directions at an angle to each other, said stop being also adjustable with said support, and means for driving the chuck.

14. The combination with an abrading wheel for a plate, of a rotary chuck for the plate, a pivoted arm on which said chuck is journaled, a support on which said pivoted arm is pivoted to swing toward and from the abrading wheel, means for adjusting said support in directions at an angle to each other, means for driving the chuck, a clutch connecting the chuck to the driving means, and a trip device for actuating the clutch to stop the rotation of the chuck when the chuck is swung away from the abrading wheel, said trip device being adjustable with said support.

15. The combination with an abrading wheel for a plate, of a rotary chuck for the plate, a support on which the chuck is journaled and which is mounted to swing the chuck toward and from the abrading wheel, a spring between the chuck and the support for pressing the plate against the wheel, and a stop for limiting the swinging movement of the chuck toward the abrading wheel.

16. The combination with an abrading wheel for a plate, of a vacuum chuck on which the plate is held by atmospheric pressure and which is movable for placing the plate into and out of operative contact with the abrading wheel and is loosely held with the plate in contact with the abrading wheel and is free to move away from the abrading wheel, a spring which presses the chuck toward the abrading wheel for holding the plate yieldingly against the abrading wheel, means for rotating the chuck, means for stopping the rotation of the chuck when securing the plate thereon, and means for controlling the vacuum to hold and release the plate.

17. The combination with an abrading wheel for a plate, of a rotary chuck for the plate, a support on which the chuck is journaled and which is mounted to move the chuck toward and from the abrading wheel, said support being held loosely with the chuck in operative relation to the abrading wheel and being free to move away from the abrading wheel, and a spring between the chuck and the support which presses the chuck toward the abrading wheel and holds the plate yieldingly against the abrading wheel.

Witness our hands this 12th day of July, 1916.

WILLIAM LA HODNY.
FRANK X. KIBITZ.

Witnesses:
M. J. PITMAN,
F. E. PROCHNOW.